United States Patent
Rodoper et al.

(10) Patent No.: US 9,578,596 B1
(45) Date of Patent: Feb. 21, 2017

(54) ADJUSTING DATA STORAGE ALLOCATION FOR ACCESS POINT INFORMATION

(71) Applicant: Amazon Technologies, Inc., Reno, NV (US)

(72) Inventors: Mete Rodoper, Sunnyvale, CA (US); Abinash Mahapatra, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 173 days.

(21) Appl. No.: 14/274,299

(22) Filed: May 9, 2014

(51) Int. Cl.
 *H04W 4/00* (2009.01)
 *H04W 48/16* (2009.01)
 *H04W 8/22* (2009.01)

(52) U.S. Cl.
 CPC .............. *H04W 48/16* (2013.01); *H04W 8/22* (2013.01)

(58) Field of Classification Search
 CPC ............ H04N 1/407; H04N 1/60; H04Q 7/00; H04Q 7/20; H04M 3/00; G06F 12/00; G06F 3/12
 See application file for complete search history.

(56) References Cited

U.S. PATENT DOCUMENTS

| | | | |
|---|---|---|---|
| 8,843,459 B1* | 9/2014 | Aston | G06F 17/30067 707/694 |
| 2005/0021792 A1* | 1/2005 | Nishida | G06F 21/52 709/229 |
| 2010/0157067 A1* | 6/2010 | Karn | H04N 1/00204 348/207.1 |
| 2012/0294231 A1* | 11/2012 | Finlow-Bates | H04W 48/14 370/328 |

FOREIGN PATENT DOCUMENTS

| | | |
|---|---|---|
| EP | 2235980 A1 | 10/2010 |
| WO | 2009124348 A1 | 10/2009 |

* cited by examiner

*Primary Examiner* — Anez Ebrahim
(74) *Attorney, Agent, or Firm* — Sutherland Asbill & Brennan LLP (57) ABSTRACT

Systems, methods, and computer-readable media are disclosed for dynamically adjusting the amount of mobile device data storage allocated for storing information associated with wireless access points. The amount of allocated data storage may be determined or adjusted based on storage allocation parameter data such as AP density data, device mobility data, route data, or the like.

19 Claims, 5 Drawing Sheets

ADJUSTING DATA STORAGE ALLOCATION FOR ACCESS POINT INFORMATION

BACKGROUND

Information associated with Wi-Fi access points (APs), such as Media Access Control (MAC) addresses of APs, may be received and stored on a mobile device for a variety of reasons. For example, Wi-Fi AP information may be stored on a mobile device to reduce the number of server requests needed to calculate Wi-Fi based locations for the device, to facilitate faster authentication with an AP, and so forth. Embodiments discussed herein improve these and other types of systems.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for determining an amount of device data storage to allocate for the storage of wireless access point (AP) information. Due to limited storage on a mobile or other type of device, Wi-Fi tile data may need to be deleted in order to accommodate additional Wi-Fi tile data. As such, the same Wi-Fi tile data may be deleted and re-downloaded if device storage that is allocated for Wi-Fi tile data is exhausted. Accordingly, advantages of storing Wi-Fi tile data locally on a device (e.g., faster local look-ups) are negated by the increased bandwidth use and latency associated with the increased number of Wi-Fi tile data downloads.

In one or more example embodiments, a user device, such as a mobile device, may receive information associated with an AP (e.g., a MAC address, a Service Set Identifier (SSID), header information, etc.) from a server. Such AP information may be received for multiple APs in order to facilitate faster local device lookups in connection with, for example, Wi-Fi based location services.

A geographic region that includes various APs may be referred to herein as a tile or a Wi-Fi tile (if the AP communicates with user devices wirelessly using any of the Institute of Electrical and Electronics Engineers (IEEE) 802.11 communication standards). The receipt and storage of Wi-Fi AP information on a device may be referred to as tiling. In certain example embodiments, a certain amount of device data storage may be allocated for each tile (e.g., 50 kilobytes). Further, AP information associated with a particular AP may require some smaller portion of data storage (e.g., 6-10 bytes). In such example embodiments, the geographic region associated with a tile may vary in size in order to encompass a number of APs corresponding to the per-tile storage allocation.

For example, in a densely populated area (e.g., Midtown Manhattan), a geographic region of a certain size may include a far greater number of APs than a geographic region of the same size in a less densely populated area (e.g., a suburb of Atlanta). In those example embodiments in which a fixed amount of data storage is allocated per tile, the number of APs per tile may be relatively uniform. The actual geographic region covered per tile, however, may differ based on the AP density of the geographic region.

In other example embodiments, a tile may refer to a geographic region of a fixed size (e.g., a fixed amount of $km^2$). In such example embodiments, the number of APs within a particular tile may differ (sometimes significantly) based on the particular geographic region to which the tile corresponds. Accordingly, in such example embodiments, the amount of data storage allocated for a particular tile may differ depending on the number of APs within the tile, and thus, the total size of the corresponding AP information.

A mobile device may allocate a static amount of data storage for storing Wi-Fi tile data. As such, Wi-Fi tile data may need to be continually deleted in order to accommodate additional Wi-Fi tile data. The number of Wi-Fi tile data deletions and downloads may become relatively excessive when travelling through a number of different geographic regions, in particular, regions that are densely populated with APs. In addition, certain Wi-Fi tile data may need to be deleted and re-downloaded many times such as, for example, Wi-Fi tile data corresponding to APs located along a daily commute route.

Example embodiments of the disclosure include systems, methods, and computer-readable media for dynamically adjusting the amount of device data storage allocated for storing AP information (e.g., Wi-Fi the data). The amount of data storage to allocate to Wi-Fi tile data may be determined based at least in part on data corresponding to one or more storage allocation parameters. The storage allocation parameter data may include, for example, data that indicates a density of APs within a certain geographic region (e.g., a number of APs having coverage areas that encompass a current, historical, or anticipated location of a device), route data that indicates a current, historical, or anticipated route traversed by the device, mobility data that indicates an instantaneous or average speed of the device, and so forth.

In an example embodiment of the disclosure, a mobile device may perform a wireless scan for Wi-Fi APs that are within communication range of the device. In response to the wireless scan, the mobile device may receive information including AP identifiers (e.g., MAC addresses) for APs that are within communication range of the device. The mobile device (or another device such as a server) may be configured to identify the APs within communication range of the mobile device based on the AP identifiers. Thus, APs detected based on the wireless scan may be referred to herein as "identifiable."

The device may transmit a request to a remote server to determine a location of the mobile device. The request may include at least a portion of the AP information received responsive to the wireless scan. The remote server may calculate a location of the mobile device based on the AP information received in the request using, for example, Wi-Fi based positioning techniques. For example, the remote server may compare the received AP information to stored information indicative of known positions of various APs to determine a location of the mobile device.

In certain example embodiments, the remote server may determine a location of the mobile device using other alternative or additional positioning techniques such as, for example, based on a global navigation satellite system (GNSS) such as the Global Positioning System (GPS). For example, the remote server may receive GPS coordinates from a GPS receiver of the mobile device.

Once the remote server has determined the mobile device's location, the remote server may determine an amount of device data storage to allocate to storing AP information (e.g., Wi-Fi the data) based at least in part on the determined location. For example, the remote server may determine an AP density of a geographic region that includes the determined location. For a higher AP density, the remote server may determine that a greater amount of device data storage should be allocated for storing Wi-Fi tile data. Similarly, for a lower AP density, the remote server may determine that a lesser amount of device data storage should be allocated for storing Wi-Fi tile data. The geographic region for which an AP density is determined may include one or more Wi-Fi tiles of a fixed geographic size (with potentially a variable number of APs) and/or one or more Wi-Fi tiles of a variable size (with potentially a relatively uniform number of APs).

More specifically, the amount of device data storage to allocate for storing Wi-Fi tile data may be determined as a function of the AP density of a geographic region that includes APs detected based on the wireless scan performed by the mobile device as well as, potentially, additional AP(s). As a non-limiting example, the amount of device data storage to allocate may be proportional to the AP density. As another non-limiting example, the amount of device data storage to allocate may correspond to the sum of: i) some initial baseline amount of data storage that is allocated regardless of the AP density, and ii) an amount of data storage determined by multiplying the AP density by a proportionality constant. It should be appreciated that the above examples are merely illustrative and that any suitable function may be employed to determine the amount of device data storage to allocate for storing Wi-Fi tile data.

The remote server may then transmit a message to the mobile device that includes an indication of the determined device location as well as an indication of the determined amount of device data storage to allocate for storing Wi-Fi tile data. The mobile device may, in turn, allocate the appropriate amount of device storage and transmit a request to the remote server for the Wi-Fi tile data. The mobile device may utilize any suitable mechanism to allocate the data storage for storing the Wi-Fi tile data including, without limitation, a memory allocation command (e.g., a malloc command), a memory management system, a file stub, or the like. The data storage that the device allocates may include various forms of non-volatile data storage (e.g., hard disk storage) and/or various forms of volatile data storage (e.g., random access memory (RAM)). For example, in certain example embodiments, the data storage that the device allocates may include first data storage and/or second data storage, where data can be written to and read from the first data storage at a faster rate than data can be written to or read from the second data storage.

In certain example embodiments, the remote server may determine the amount of device data storage to allocate for storing Wi-Fi tile data further based at least in part on other storage allocation parameter data associated with the device such as, for example, route data, mobility data, and so forth. For example, the remote server may receive or otherwise retrieve data indicative of a current speed of a user of the mobile device, an average speed of the user over some recent period of time, a historical average speed of the user, and so forth. The remote server may then determine that the amount of device data storage that should be allocated for storing Wi-Fi tile data should be adjusted in relation to the mobility data.

For example, a greater amount of device data storage may be allocated for Wi-Fi tile data in scenarios in which the mobility data indicates a higher user speed than for scenarios in which the mobility data indicates a lower user speed. In particular, if a mobile user is moving at a relatively high speed (e.g., the user, and thus, the mobile device are travelling in a vehicle), the mobile device may download an amount of Wi-Fi tile data that quickly exhausts the allocated device data storage. As such, allocating a larger amount of device storage for higher user speeds may prevent premature exhaustion of the allocated device storage.

In certain example embodiments, a respective amount of allocated data storage may be correlated to each of a variety of speeds or ranges of speeds. Further, the amount of data storage that is allocated may increase incrementally in relation to an increase in the device mobility state from a first state to a second state (e.g., from a speed within a first range to a speed within a second higher range). In certain example embodiments, the mobility data may be captured by, for example, an accelerometer of the mobile device.

The remote server may also utilize route data to determine the amount of device data storage to allocate to storing Wi-Fi tile data. For example, the remote server may receive from the mobile device or otherwise retrieve route data indicating that a user of the mobile device is travelling along a route that is repeatedly frequently (e.g., a daily commute route). In such example embodiments, the remote server may increase the amount of data storage allocated for storing Wi-Fi tile data. In certain other example embodiments, the remote server may transmit periodic messages to the mobile device indicating dynamic adjustments to be made to the amount of data storage allocated for storing Wi-Fi tile data based on changes in the AP density along the route. In still other example embodiments, the remote server may receive from the mobile device or otherwise retrieve data indicating a particular time of day during which the user of the mobile device travels along a particular path. In such example embodiments, the remote server may transmit a message to the mobile device to increase the data storage allocated for Wi-Fi the data during that particular time of day.

In certain other example embodiments, the mobile device itself may determine an amount of device data storage to allocate for storing Wi-Fi tile data. For example, a mobile device may scan for APs within communication range of the device. More specifically, the mobile device may send out probe request frames requesting APs within range of the mobile device to transmit identifying information such as MAC addresses of the APs. Alternatively or additionally, an AP may broadcast a beacon signal containing identifying information (e.g., a MAC address) that is received by the mobile device.

The mobile device may then determine a density of APs that are within communication range based on the results of the Wi-Fi scanning. In particular, the mobile device may assess the number of APs detected based on the scanning to determine an AP density for a geographic region containing the location of the device. The mobile device may then allocate data storage on the device for Wi-Fi tile data based at least in part on the determined AP density. It should be appreciated that in certain example embodiments, the mobile device may determine an AP density for a geographic region that includes additional APs beyond those detected by the mobile device as part of the wireless scanning.

In certain example embodiments, the mobile device may additionally or alternatively determine the amount of device data storage to allocate to Wi-Fi tile data based at least in part on other storage allocation parameter data such as mobility data, route data, and so forth. For example, the mobile device may capture mobility data indicative of a speed of a user of the mobile device which, in turn, may indicate a speed of the mobile device itself, and the data storage allocated for storing Wi-Fi tile data may be adjusted accordingly. Higher speeds may correlate to larger allocations of device storage for Wi-Fi tile data.

Similarly, the mobile device may assess route data to determine an amount of data storage to allocate for storing Wi-Fi tile data. As discussed above with respect to the remote server, the mobile device may capture route data from, for example, a navigation application executing on the mobile device, and may adjust the amount of data storage allocated for Wi-Fi tile data accordingly. For example, the mobile device may determine a planned route, a daily commute route, or the like and adjust the data storage allocation to ensure that all Wi-Fi tile data that will be downloaded along the route can be accommodated without requiring any Wi-Fi tile data deletions. In certain other example embodiments, the mobile device may assess Wi-Fi tile data deletions and downloads that may occur during a daily commute, and may adjust the data storage allocated for Wi-Fi tile data for future commutes accordingly. In addition, more generally, the mobile device may track Wi-Fi tile data deletions and downloads over some period of time and may adjust the data storage allocation in order to reduce the number of data deletions and downloads.

As previously described, the data storage that may be allocated for Wi-Fi tile data may include non-volatile data storage (e.g., magnetic disk storage, optical disk storage, etc.) and/or volatile data storage (e.g., RAM, cache memory, etc.). The volatile data storage may be associated with faster read/write access than the non-volatile data storage. In certain example embodiments, the amount of volatile data storage allocated for Wi-Fi tile data may be dynamically adjusted independently of the amount of non-volatile data storage allocated for Wi-Fi the data. For example, in order to minimize the latency associated with hard disk drive reads, the amount of faster read/write access (e.g., volatile) data storage allocated for Wi-Fi tile data may be increased based on any suitable storage allocation parameter data including, for example, AP density data, device mobility data, route data, or the like.

Example embodiments of the disclosure provide a number of advantages or technical effects. For example, the dynamic determination and adjustment to device data storage allocation for Wi-Fi tile data provided by example embodiments of the disclosure minimize the latency and monetary costs associated with the increased number of Wi-Fi tile data deletions and downloads necessitated by static data storage allocations. In addition, by assessing a greater breadth of types of data (e.g., AP density data, device mobility data, route data, etc.), example embodiments of the disclosure provide the capability of making more nuanced and granular device data storage allocation determinations. It should be appreciated that the above examples of advantages and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative System Architecture

Figure 1:
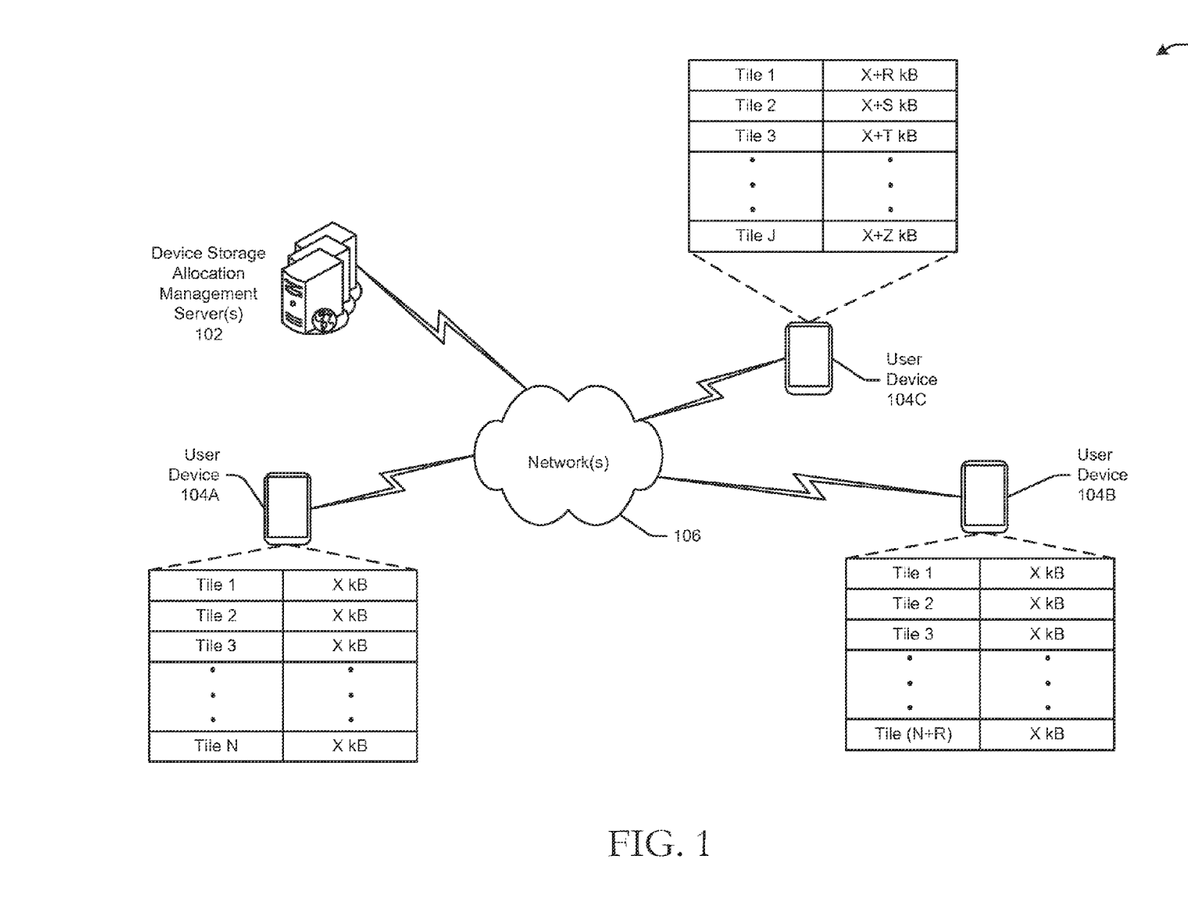
FIG. 1 is a schematic block diagram of an illustrative networked architecture in accordance with one or more example embodiments of the disclosure.

FIG. 1 is a schematic block diagram of an illustrative networked architecture 100 in accordance with one or more example embodiments of the disclosure. The illustrative architecture 100 may include one or more device storage allocation management servers 102 and one or more user devices 104A, 104B, 104C. While three representative user devices are depicted in FIG. 1, it should be appreciated that any number of user devices may be provided. Further, while the device storage allocation management server(s) 102 may be referred to herein in the singular for ease of explanation, it should be appreciated that any number of server(s) 102 may be provided, and that processing described as being performed by a server 102 may be distributed across multiple servers 102.

The device storage allocation management server 102 may include any suitable computing device including, but not limited to, a server computer, a mainframe computer, a workstation, a desktop computer, a laptop computer, and so forth. The user devices 104A, 104B, and 104C may include any suitable user device including, but not limited to, a smartphone or other cellular device, a tablet device, an electronic reader device, a desktop computing device, a laptop computing device, a multimedia content streaming device, or any other suitable device.

The device storage allocation management server 102 and the user devices 104A, 104B, and 104C may be configured to communicate via one or more networks 106. The network(s) 106 may include, but are not limited to, any one or more different types of communication networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 106 may have any suitable communication range associated therewith and may include, for example, global networks (e.g., the Internet), metropolitan area networks (MANs), wide area networks (WANs), local area networks (LANs), or personal area networks (PANs). In addition, the network(s) 106 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

As described above and as will be described in more detail below, the device storage allocation management server 102 may be configured to determine an amount of device storage that a user device should allocate for Wi-Fi tile data. This determination may be made dynamically based at least in part on one or more types of storage allocation parameter data including, but not limited to, AP density data, device mobility data, device route data, and so forth. More specifically, computer-executable code, instructions, or the like may be executed by one or more processing units of the device storage allocation management server 102 to cause processing to be performed to determine device data storage allocations for Wi-Fi tile data for various user devices. Accordingly, the device storage allocation management server 102 configured to execute such computer-executable code, instructions, or the like may form a special-purpose computing device.

In alternative or additional embodiments, any given user device (e.g., user device 104A, 104B, 104C) may be configured to determine device data storage allocation for Wi-Fi tile data based on any of the types of storage allocation parameter data discussed above. More specifically, computer-executable code, instructions, or the like may be executed by one or more processing units of a user device to cause processing to be performed to determine an amount of data storage of the device that should be allocated for Wi-Fi tile data. Accordingly, a user device configured to execute such computer-executable code, instructions, or the like may form a special-purpose computing device.

In still other example embodiments, the device storage allocation management server 102 may make an initial determination regarding device data storage allocation for Wi-Fi tile data based, for example, on AP density data. The device storage allocation management server 102 may communicate a message to the user device that indicates this initial determination. The user device may then proceed to modify this initial determination based on other types of storage allocation parameter data such as, for example, mobility data or route data.

FIG. 1 depicts a variety of different data storage allocations for Wi-Fi tile data. For example, in an example embodiment, user device 104A may allocate X kB of data storage per Wi-Fi tile and may allocate a total of NX kB of device data storage for a total of N Wi-Fi tiles. As previously noted, a same amount of data storage may be allocated per tile, in which case, the tiles may correspond to geographic regions that may vary in physical size, but which may include a relatively uniform number of APs per tile. Thus, a tile corresponding to a high AP density area such as a neighborhood in Manhattan may encompass a significantly smaller physical area than a tile in a suburban area having a relatively lower AP density.

In another example embodiment, user device 104B may allocate X kB of data storage per Wi-Fi tile and may allocate a total of (N+R)X kB of device data storage for a total of (N+R) Wi-Fi tiles. Thus, user device 104B may allocate a greater amount of device data storage for Wi-Fi tile data than user device 104A. User device 104B may allocate a greater amount of device data storage for Wi-Fi tile data than user device 104A for any of a variety of reasons. For example, a user of user device 104B may be travelling at a higher speed than a user of user device 104A. For example, a user of user device 104A may be stationary or travelling at a lower speed than a user of user device 104B. As another non-limiting example, a route traversed by a user of user device 104B (e.g., a commute route) may pass through the coverage areas of a greater number of APs than a route traversed by a user of user device 104A, and thus, a larger allocation of device data storage for Wi-Fi tile data may be required for user device 104B in order to accommodate the greater number of Wi-Fi tile data downloads. In yet another non-limiting example, an AP density of a geographic region encompassing a location of user device 104B may be greater than an AP density of a geographic region encompassing a location of user device 104A. It should be appreciated that the above examples of scenarios that may result in a greater allocation of device data storage for Wi-Fi tile data for user device 104B as compared to user device 104A are merely illustrative and not exhaustive.

In another example embodiment, user device 104C may allocate a different amount of device data storage for data corresponding to each Wi-Fi tile. For example, data corresponding to a first Wi-Fi tile (e.g., Tile 1) may be allocated (X+R) kB of data storage, data corresponding to a second Wi-Fi tile (e.g., Tile 2) may be allocated (X+S) kB of data storage, data corresponding to a Jth Wi-Fi the (e.g., Tile J) may be allocated (X+Z) kB of data storage, and so forth. In such embodiments, each tile may correspond to a relatively uniform physical area and the number of APs located within each tile may vary.

The amount of data storage allocated for each tile as well as the total device data storage allocated for all Wi-Fi tile data may be dynamically determined based on any of a variety of types of storage allocation parameter data such as, for example, AP density data, device mobility data, route data, or the like. For example Tile 3 may have a greater AP density than Tile 2, in which case, the (X+T) kB of data storage allocated for Tile 3 may be greater than the (X+S) kB of data allocated for Tile 2. As another non-limiting example, the total amount of storage allocated for all Tiles 1 through J may be dynamically determined based at least in part on mobility data (e.g., a user speed), route data (e.g., a current, planned, or historical user route), and so forth.

Figure 2:
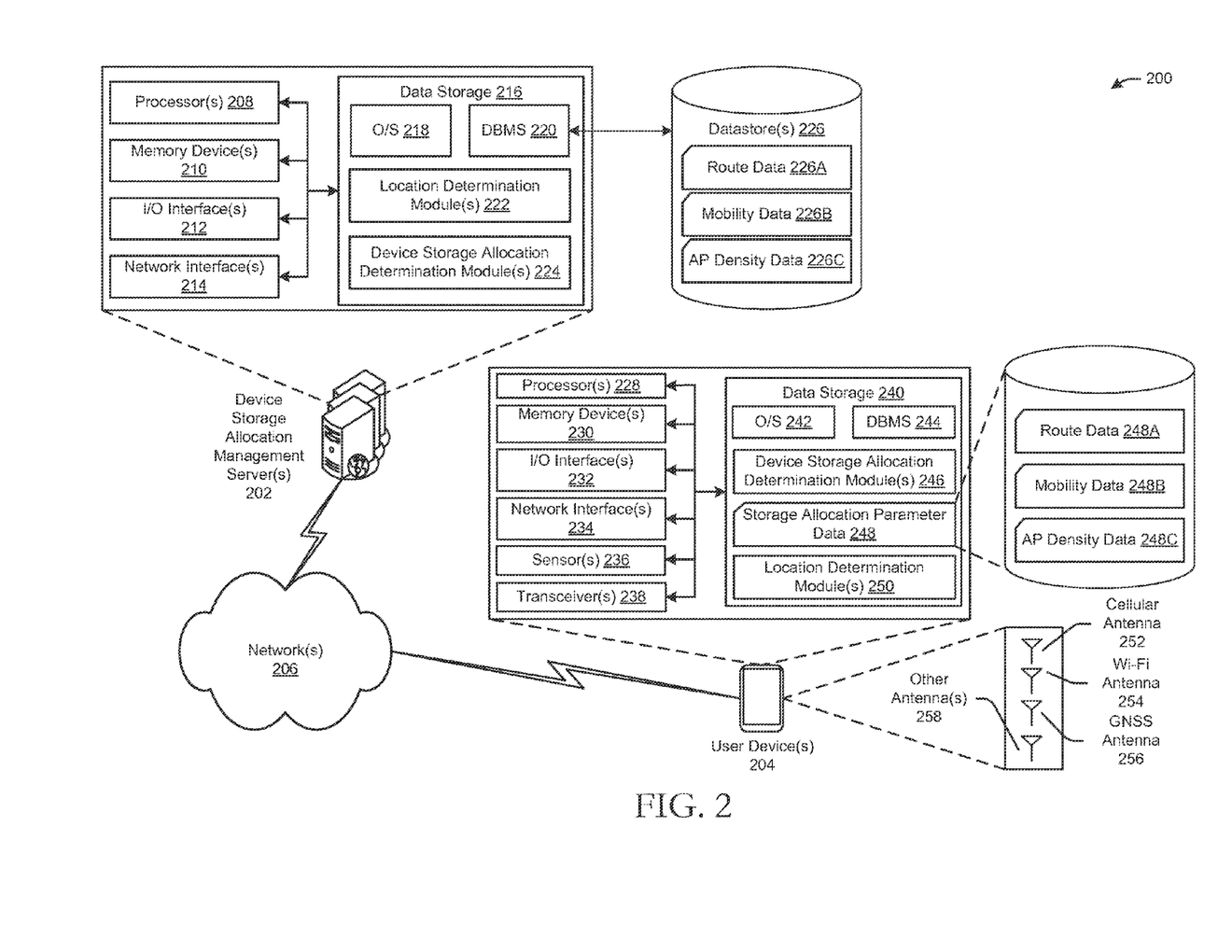
FIG. 2 is a more detailed schematic block diagram of an illustrative system architecture in accordance with one or more example embodiments of the disclosure.

FIG. 2 is a more detailed schematic block diagram of an illustrative system architecture 200 in accordance with one or more example embodiments of the disclosure. The architecture 200 may correspond to an illustrative configuration of the architecture 100. It should be appreciated that FIG. 2 depicts merely example architectural and device configurations and that numerous modifications, variations, or the like are within the scope of this disclosure.

The architecture 200 may include one or more device storage allocation management servers 202 and one or more user devices 204. In an illustrative embodiment, the device storage allocation management server(s) 202 may include one or more of the device storage allocation management server(s) 102. Similarly, the user device(s) 204 may include one or more of the user devices 104A, 104B, and 104C. In addition, the device storage allocation management server(s) 202 and the user device(s) 204 may be configured to communicate via one or more networks 206 which may include any one or more of the network(s) 106. For ease of explanation, and without limitation, the device storage allocation management server(s) 202 and the user device(s) 204 will be referred to hereinafter in the singular.

In an illustrative configuration, the device storage allocation management server 202 may include one or more processors (processor(s)) 208, one or more memory devices 210 (generically referred to herein as memory 210), one or more input/output ("I/O") interface(s) 212, one or more network interfaces 214, and data storage 216. These various components will be described in more detail hereinafter.

The memory 210 of the device storage allocation management server 202 may include volatile memory (memory that maintains its state when supplied with power) such as various forms of random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 210 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 210 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 216 may include removable storage and/or non-removable storage including, but not limited to, magnetic storage, optical disk storage, and/or tape storage. The data storage 216 may provide non-volatile storage of computer-executable instructions and other data. The data storage 216 may include storage that is internal and/or external to the device storage allocation management server 202. The memory 210 and the data storage 216, removable and/or non-removable, are examples of computer-readable storage media (CRSM) as that term is used herein.

The data storage 216 may store computer-executable code, instructions, or the like that may be loadable into the memory 210 and executable by the processor(s) 208 to cause various operations to be performed. The data storage 216 may additionally store data that may be copied to memory 210 for use by the processor(s) 208 during the execution of the computer-executable instructions. Moreover, output data generated as a result of execution of the computer-executable instructions by the processor(s) 208 may be stored initially in memory 210, and may ultimately be copied to data storage 216 for non-transient storage.

More specifically, the data storage 216 may store one or more operating systems (O/S) 218; one or more database management systems (DBMS) 220; and one or more program modules, applications, or the like such as, for example, one or more location determination modules 222, one or more device storage allocation determination modules 224, and so forth.

The location determination module(s) 222 may include computer-executable instructions that, responsive to execution by one or more of the processor(s) 208, may cause operations to be performed for determining a location of a user device 204. For example, the location determination module(s) 222 may include computer-executable instructions that responsive to execution may cause a location of a user device 204 to be determined responsive to receipt of a request from the user device 204. In certain example embodiments, a request received from a user device 204 may include identifying information (e.g., MAC addresses) corresponding to APs detected by the user device 204 during a Wi-Fi scan. Computer-executable instructions of the location determination module(s) 222 may be executed to compare the received AP identifying information to stored AP identifying information corresponding to APs having known locations in order to determine a location of the user device 204 in accordance with a Wi-Fi based positioning technique. In other example embodiments, the location determination module(s) 222 may be configured to determine a user device's location based on alternative or additional positioning techniques such as, for example, based on GPS information (e.g., GPS coordinates) received from a user device 204.

The device storage allocation determination module(s) 224 may include computer-executable instructions that responsive to execution by one or more of the processor(s) 208 may cause operations to be performed to determine an amount of data storage on a user device 204 to be allocated for Wi-Fi tile data. In accordance with various example embodiments described herein, the device storage allocation module(s) 224 may determine device storage allocation for Wi-Fi tile data based on any of a variety of types of storage allocation parameter data including, for example, route data 226A, mobility data 226B, AP density data 226C, and so forth. More specifically, as described herein, the device storage allocation determination module(s) 224 may be configured to dynamically determine the amount of volatile and/or non-volatile data storage to be allocated for Wi-Fi tile data stored on a user device 204 based on a current state of the user device 204 and/or changes in state of the user device 204 indicated by at least a portion of the route data 226A, at least a portion of the mobility data 226B, and/or at least a portion of the AP density data 226C. The amount of device data storage allocated for the storage of Wi-Fi tile data may be determined based on any suitable function that may receive at least a portion of the route data 226A, at least a portion of the mobility data 226B, and/or at least a portion of the AP density data 226C as input.

The device storage allocation management server 202 may transmit a message to the user device 204 that indicates an amount of data storage to allocate to Wi-Fi tile data, as determined by the device storage allocation determination module(s) 224. In certain example embodiments, the device storage allocation management server 202 may also store, and transmit to the user device 204, the Wi-Fi tile data. In other example embodiments, one or more other servers may store the Wi-Fi tile data.

In certain example embodiments, the route data 226A, mobility data 226B, and/or AP density data 226C may include data corresponding to multiple user devices 204. As such, to determine device storage allocation for a particular user device 204, the device storage allocation determination module(s) 224 may utilize that portion of the route data 226A, mobility data 226B, and/or AP density data 226C corresponding to the particular user device 204 and/or a location of the particular user device 204. The datastore(s) 226 illustratively depicted in FIG. 2 as containing the data 226A, 226B, and 226C may be internal to the device storage allocation management server 202 (e.g., datastore(s) forming part of the data storage 216) or external datastore(s). Further, any of the data illustratively depicted as being stored in the datastore(s) 226 may be loaded into the memory 210 as needed. Any portion of the route data 226A, the mobility data 226B, and/or the AP density data 226C may be received from user devices 204 via a push or pull mechanism. Alternatively, certain data (e.g., the AP density data 226C) may be independently gathered by the device storage allocation management server 202.

Referring now to other illustrative components of the device storage allocation management server 202, the O/S 218 may be loaded from the data storage 216 into the memory 210 and may provide an interface between other application software executing on the device storage allocation management server 202 and hardware resources of device storage allocation management server 202. More specifically, the O/S 218 may include a set of computer-executable instructions for managing hardware resources of the device storage allocation management server 202 and for providing common services to other application programs (e.g., managing memory allocation among various application programs). The O/S 218 may include any operating system now known or which may be developed in the future including, but not limited to, any server operating system, any mainframe operating system, or any other proprietary or non-proprietary operating system.

The DBMS 220 may be loaded into the memory 210 and may support functionality for accessing, retrieving, storing, and/or manipulating data stored in one or more of the datastores 226, data stored in the memory 210, and/or data stored in the data storage 216. The DBMS 220 may use any of a variety of database models (e.g., relational model, object model, etc.) and may support any of a variety of query languages. The datastore(s) 226 may include any suitable data repository including, but not limited to, databases (e.g., relational, object-oriented, etc.), file systems, flat files, distributed datastores in which data is stored on more than one node of a computer network, peer-to-peer network datastores, or the like. Any of the datastore(s) 226 may represent data in one or more data schemas.

The processor(s) 208 may be configured to access the memory 210 and execute computer-executable instructions loaded therein. For example, the processor(s) 208 may be configured to execute computer-executable instructions of the various program modules of the device storage allocation management server 202 to cause or facilitate various operations to be performed in accordance with one or more embodiments of the disclosure. The processor(s) 208 may include any suitable processing unit capable of accepting data as input, processing the input data in accordance with stored computer-executable instructions, and generating output data. The processor(s) 208 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 208 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 208 may be capable of supporting any of a variety of instruction sets.

The device storage allocation management server 202 may further include one or more input/output (I/O) interfaces 212 that may facilitate the receipt of input information by the device storage allocation management server 202 from one or more I/O devices as well as the output of information from the device storage allocation management server 202 to the one or more I/O devices. The I/O devices may include, for example, one or more user interface devices that facilitate interaction between a user and the device storage allocation management server 202 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The device storage allocation management server 202 may be configured to communicate with any of a variety of other systems, platforms, networks, devices, and so forth (e.g., a user device 204) via one or more of the network(s) 206. The device storage allocation management server 202 may include one or more network interfaces 214 that may facilitate communication between the device storage allocation management server 202 and any of the systems, networks, platforms, devices, or components of the system architecture 200.

Referring now to other illustrative components of the architecture 200, in an illustrative configuration, the user device 204 may include one or more processors (processor(s)) 228, one or more memory devices 230 (generically referred to herein as memory 230), one or more input/output ("I/O") interface(s) 232, one or more network interfaces 234, one or more sensors 236, one or more transceivers 238, and data storage 240. The user device 204 may further include a cellular antenna 252 for transmitting or receiving signals to/from a cellular network infrastructure, an antenna 254 for transmitting or receiving Wi-Fi signals to/from an AP, an antenna 256 for receiving GNSS signals from a GNSS satellite, and one or more other antenna(s) 258 such as, for example, a Bluetooth antenna for transmitting or receiving Bluetooth signals, a Near Field Communication (NFC) antenna for transmitting or receiving NFC signals, and so forth. These various components will be described in more detail hereinafter.

The antennas 252, 254, 256, and 258 may include any suitable type of antenna depending, for example, on the communications protocols used to transmit or receive signals via the antennas 252, 254, 256, and 258. Non-limiting examples of suitable antennas may include directional antennas, non-directional antennas, dipole antennas, folded dipole antennas, patch antennas, multiple-input multiple-output (MIMO) antennas, or the like. The antennas 252, 254, 256, and 258 may be communicatively coupled to one or more transceivers 238 or radio components to which or from which signals may be transmitted or received.

The cellular antenna 252 may be configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The Wi-Fi antenna 254 may be configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11 ac), or 60 GHZ channels (e.g. 802.11 ad). In alternative example embodiments, the antenna 254 may be configured to transmit or receive radio frequency signals within any suitable frequency range forming part of the unlicensed portion of the radio spectrum.

The GNSS antenna 256 may be configured to receive GNSS signals from three or more GNSS satellites carrying time-position information to triangulate a position therefrom. The GNSS antenna 256 may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 238 may include any suitable radio component(s) for—in cooperation with the antennas 252, 254, 256, and 258—transmitting or receiving radio frequency (RF) signals in the bandwidth and/or channels corresponding to the communications protocols utilized by the user device 204 to communicate with other devices. The transceiver(s) 238 may include hardware, software, and/or firmware for modulating, transmitting, or receiving—potentially in cooperation with any of antennas 252, 254, 256, and 258—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 238 may further include hardware, firmware, or software for receiving GNSS signals via, for example, the antenna 256. The transceiver(s) 238 may include any known receiver and baseband suitable for communicating via the communications protocols utilized by the user device 204. The transceiver(s) 238 may further include a low noise amplifier (LNA), additional signal amplifiers, an analog-to-digital (A/D) converter, one or more buffers, digital baseband, or the like.

The sensor(s) 236 may include any suitable type of sensing device such as, for example, inertial sensors, force sensors, thermal sensors, and so forth. Example types of inertial sensors may include accelerometers (e.g., MEMS-based accelerometers), gyroscopes, and so forth.

The memory 230 of the user device 204 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 230 may include multiple different types of memory, such as any of the types of memory described with reference to the memory 210 of the device storage allocation management server 202. The memory 230 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 240 may include removable storage and/or non-removable storage including, but not limited to, magnetic storage, optical disk storage, and/or tape storage. The data storage 240 may provide non-volatile storage of computer-executable instructions and other data. The memory 230 and the data storage 240, removable and/or non-removable, are examples of computer-readable storage media (CRSM) as that term is used herein.

The data storage 240 may store computer-executable code, instructions, or the like that may be loadable into the memory 230 and executable by the processor(s) 228 to cause various operations to be performed. The data storage 240 may additionally store data that may be copied to memory 230 for use by the processor(s) 228 during the execution of the computer-executable instructions. Moreover, output data generated as a result of execution of the computer-executable instructions by the processor(s) 228 may be stored initially in memory 230, and may ultimately be copied to data storage 240 for non-transient storage.

More specifically, the data storage 240 may store one or more operating systems (O/S) 242; one or more database management systems (DBMS) 244; and one or more program modules, applications, or the like such as, for example, one or more device storage allocation determination modules 246, one or more location determination module(s) 250, and so forth. In addition, the data storage 240 may store various types of data such as, for example, storage allocation parameter data 248.

The storage allocation parameter data 248 may include, for example, route data 248A, mobility data 248B, and/or AP density data 248C. The route data 248A may include data indicative of a current, anticipated, and/or historical route traversed by the user device 204. The mobility data 248B may include data indicative of a current, anticipated, or historical mobility state (e.g., user speed) of the user device 204. The AP density data 248C may include data indicative of a respective AP density for one or more geographic regions which may include a geographic region that encompasses a current location of the user device 204 and/or a geographic region that encompasses a historical or anticipated location of the user device 204.

The location determination module(s) 250 may include computer-executable instructions that, responsive to execution by one or more of the processor(s) 228, may cause operations to be performed for determining a location of a user device 204. For example, the location determination module(s) 250 may include computer-executable instructions that responsive to execution may cause a location of a user device 204 to be determined responsive to receipt of location information from the device storage allocation management server 202. In other example embodiments, the location determination module(s) 250 may include computer-executable instructions that responsive to execution may cause a location of the user device 204 to be determined based at least in part on locally stored Wi-Fi tile data. In other example embodiments, the location determination module(s) 250 may be configured to determine a location of the user device based on GNSS signals received via the GNSS antenna 256.

The device storage allocation determination module(s) 246 may include computer-executable instructions that responsive to execution by one or more of the processor(s) 228 may cause operations to be performed to determine an amount of data storage of the user device 204 that should be allocated for Wi-Fi tile data. In accordance with various example embodiments described herein, the device storage allocation module(s) 246 may determine device storage allocation for Wi-Fi tile data based on any of a variety of types of storage allocation parameter data including, for example, the route data 248A, the mobility data 248B, the AP density data 248C, and so forth. More specifically, as described herein, the device storage allocation determination module(s) 246 may be configured to dynamically determine the amount of volatile and/or non-volatile data storage of the user device 204 to be allocated for Wi-Fi tile data based on a current state of the user device 204 and/or changes in state of the user device 204 indicated by at least a portion of the route data 248A, at least a portion of the mobility data 248B, and/or at least a portion of the AP density data 248C.

Referring now to other illustrative components of the user device 204, the O/S 242 may be loaded from the data storage 240 into the memory 230 and may provide an interface between other application software executing on the user device 204 and hardware resources of the user device 204. More specifically, the O/S 242 may include a set of computer-executable instructions for managing hardware resources of the user device 204 and for providing common services to other application programs (e.g., managing memory allocation among various application programs). The O/S 242 may include any operating system now known or which may be developed in the future including, but not limited to, any server operating system, any mainframe operating system, or any other proprietary or non-proprietary operating system.

The DBMS 244 may be loaded into the memory 230 and may support functionality for accessing, retrieving, storing, and/or manipulating data stored in the memory 230 and/or data stored in the data storage 240. The DBMS 244 may use any of a variety of database models (e.g., relational model, object model, etc.) and may support any of a variety of query languages. The DBMS 244 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

The processor(s) 228 may be configured to access the memory 230 and execute computer-executable instructions loaded therein. For example, the processor(s) 228 may be configured to execute computer-executable instructions of the various program modules of the user device 204 to cause or facilitate various operations to be performed in accordance with one or more embodiments of the disclosure. The processor(s) 228 may include any suitable processing unit capable of accepting data as input, processing the input data in accordance with stored computer-executable instructions, and generating output data. The processor(s) 228 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 228 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 228 may be capable of supporting any of a variety of instruction sets.

The user device 204 may further include one or more input/output (I/O) interfaces 232 that may facilitate the receipt of input information by the user device 204 from one or more I/O devices as well as the output of information from the user device 204 to the one or more I/O devices. The I/O devices may include, for example, one or more user interface devices that facilitate interaction between a user and the user device 204 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The user device 204 may be configured to communicate with any of a variety of other systems, platforms, networks, devices, and so forth (e.g., the device storage allocation management server 202) via one or more of the network(s) 206. The user device 204 may include one or more network interfaces 234 that may facilitate communication between the user device 204 and any of the systems, networks, platforms, devices, or components of the system architecture 200.

It should be appreciated that the program modules, applications, computer-executable instructions, code, or the like depicted in FIG. 2 as being stored in the data storage 216 and/or the data storage 240 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device storage allocation management server 202, the user device 204, and/or hosted on other computing device(s) accessible via one or more of the network(s) 206 may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices of the system architecture 200 in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the device storage allocation management server 202 and/or the user device 204 may include alternate and/or additional hardware, software, or firmware components beyond those described or depicted without departing from the scope of the disclosure. More particularly, it should be appreciated that software, firmware, or hardware components depicted as forming part of any entity included in the architecture 200 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 3:
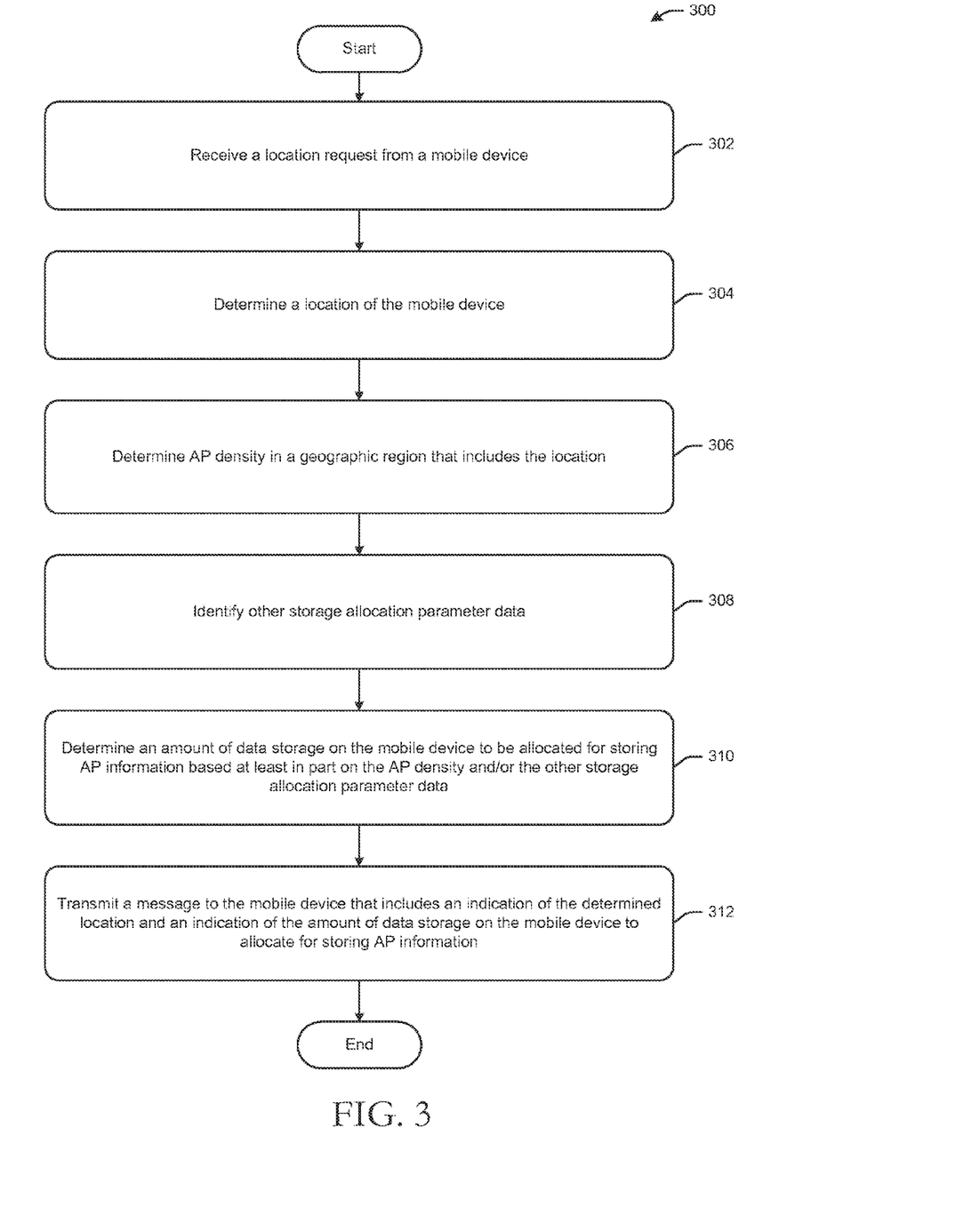
FIG. 3 is a process flow diagram of an illustrative method for determining an amount of device data storage to allocate for Wi-Fi tile data in accordance with one or more example embodiments of the disclosure.

FIG. 3 is a process flow diagram of an illustrative method 300 for determining an amount of device data storage to allocate for Wi-Fi tile data in accordance with one or more example embodiments of the disclosure. One or more operations of the method 300 may be described below as being performed by a device storage allocation management server 202, or more specifically, by one or more program modules, applications, or the like executing on a device storage allocation management server 202. It should be appreciated, however, that any of the operations of the method 300 may be performed by a user device 204, or more specifically, by one or more program modules, applications, or the like executing on a user device 204. In addition, it should be appreciated that processing performed in response to execution of computer-executable instructions provided as part of an application, program module, or the like may be interchangeably described herein as being performed by the application or the program module itself, by a device on which the application, program module, or the like is executing, or by a system that includes such a device. While the operations of the method 300 may be described in the context of the illustrative system architecture 200, it should be appreciated that such operations may be implemented in connection with numerous other architectural and device level configurations.

At block 302, the device storage allocation management server 202 may receive a location request from a mobile device. The mobile device may be a user device 204 having the illustrative configuration depicted in FIG. 2. The location request may include identifying information (e.g., MAC addresses) for APs detected by the mobile device as part of, for example, a Wi-Fi scan.

At block 304, computer-executable instructions of the location determination module(s) 222 may be executed to determine a location of the mobile device. The location determination module(s) 222 may be configured to calculate a location of the mobile device based on the AP information received in the request from the mobile device using, for example, Wi-Fi based positioning techniques. For example, the computer-executable instructions of the location determination module(s) 222 may be executed to compare the received AP information to stored information indicative of known positions of various APs to determine a location of the mobile device. In certain example embodiments, the location determination module(s) 222 may be configured to determine a location of the mobile device using other alternative or additional positioning techniques such as, for example, based on GPS information received from the mobile device.

At block 306, computer-executable instructions of the device storage allocation determination module(s) 224 may be executed to determine an AP density of a geographic region that includes the determined location of the mobile device. The geographic region may include, for example, a Wi-Fi tile that includes the determined location. The AP density may be determined from, for example, the stored AP density data 226C. The AP density may be a number of APs located within the geographic region. Alternatively, the AP density may be reflected as a number of APs per unit area.

At block 308, computer-executable instructions of the device storage allocation determination module(s) 224 may be executed to identify other storage allocation parameter data. The data identified at block 308 may include, for example, a portion of the route data 226A corresponding to the mobile device, a portion of the mobility data 226B corresponding to the mobile device, and so forth. For example, the device storage allocation determination module(s) 224 may identify a current route being traversed by a user of the mobile device, a planned route (e.g., a route mapped out using a navigation application executing on the mobile device), historical route data (e.g., a daily commute for a user of the mobile device), and so forth. In certain example embodiments, the device storage allocation determination module(s) 224 may further identify a respective AP density corresponding to each of one or more geographic regions (e.g., Wi-Fi tiles) in addition to the geographic region that includes the location of the mobile device determined at block 304. For example, the device storage allocation determination module(s) 224 may determine AP densities at various points along a current, planned, or historical route associated with the mobile device.

At block 310, computer-executable instructions of the device storage allocation determination module(s) 224 may be executed to determine, based at least in part on the AP density determined at block 306 and/or the other storage allocation parameter data identified at block 308, an amount of data storage of the mobile device to allocate to storing AP information (e.g., Wi-Fi the data). As a non-limiting example, the higher the AP density determined at block 306, the greater the amount of mobile device data storage the device storage allocation determination module(s) 224 may determine should be allocated for storing Wi-Fi tile data.

At block 312, the device storage allocation determination module(s) 224 may generate and transmit (or direct the transmission of) a message to the mobile device that includes an indication of the determined location of the mobile device as well as an indication of the amount of data storage on the mobile device to allocate for storing Wi-Fi tile data. The mobile device may, in turn, allocate the appropriate amount of device storage and transmit a request to the remote server for the Wi-Fi tile data. The data storage that the device allocates may include various forms of non-volatile data storage (e.g., hard disk storage) and/or various forms of volatile data storage (e.g., random access memory (RAM)).

In certain example embodiments, the amount of mobile device data storage to allocate for storing Wi-Fi tile data may be additionally or alternatively determined based at least in part on any portion of the other storage allocation parameter data identified at block 308. As a non-limiting example, the device storage allocation determination module(s) 224 may determine that the amount of mobile device data storage that should be allocated for storing Wi-Fi tile data should be adjusted in relation to the mobility data. For example, a greater amount of device data storage may be allocated for Wi-Fi tile data in scenarios in which the mobility data indicates a higher user speed than for scenarios in which the mobility data indicates a lower user speed.

As another non-limiting example, the device storage allocation determination module(s) 224 may determine an amount of mobile device data storage to allocate for Wi-Fi tile data based at least in part on route data. For example, the amount of mobile device data storage to allocate for Wi-Fi tile data may be adjusted to ensure that all Wi-Fi tile data downloaded during traversal of a current, planned, or historical device route can be accommodated on the mobile device. In certain other example embodiments, the device storage allocation management server 202 may transmit periodic messages to the mobile device indicating dynamic adjustments to be made to the amount of data storage allocated to Wi-Fi tile data based on changes in the AP density along the route. In still other example embodiments, device storage allocation determination module(s) 224 may determine a particular time of day during which the user of the mobile device travels along a particular path. In such example embodiments, the device storage allocation management server 202 may transmit a message to the mobile device to increase the data storage allocated for Wi-Fi tile data during that particular time of day. In yet other example embodiments, the mobile device may adjust an initial device data storage allocation determination made by the device storage allocation management server 202 based at least in part on mobility data, route data, or the like.

While certain example types of storage allocation parameters have been discussed above, it should be appreciated that any of a variety of other types of parameters may be assessed to determine device storage allocation for Wi-Fi tile data. For example, the total available data storage of the device, an amount of data storage allocated to other programs or processes, the relative priority of various programs or processes requiring memory allocation, and so forth may impact the amount of device storage allocated for the storage of Wi-Fi tile data.

Figure 4:
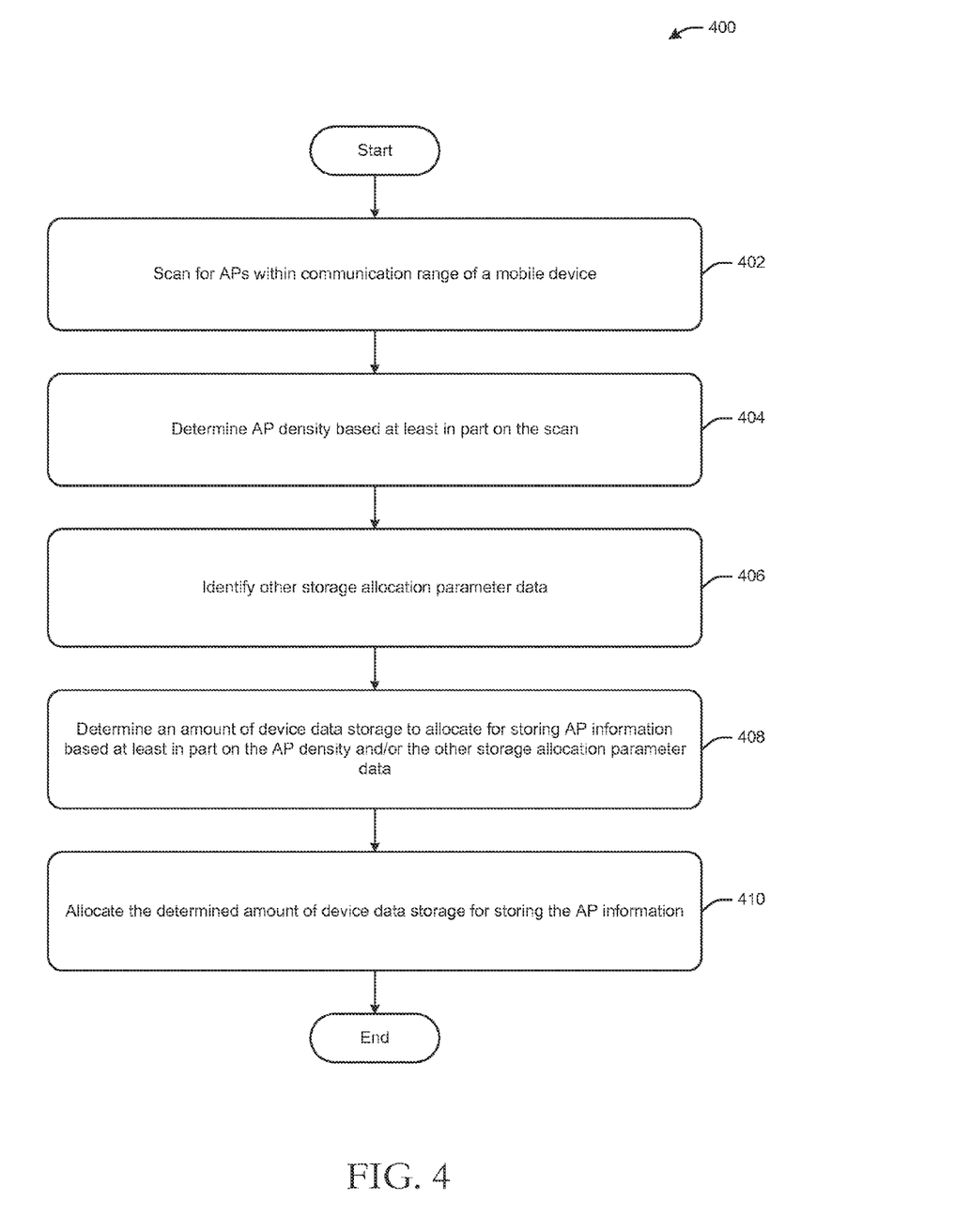
FIG. 4 is a process flow diagram of another illustrative method for determining an amount of device data storage to allocate for Wi-Fi tile data in accordance with one or more example embodiments of the disclosure.

FIG. 4 is a process flow diagram of another illustrative method 400 for determining an amount of device data storage to allocate for Wi-Fi tile data in accordance with one or more example embodiments of the disclosure.

At block 402, the user device 204 may initiate a scan (e.g., a Wi-Fi scan) for APs within communication range of the mobile device. More specifically, the mobile device may send out probe request frames requesting APs within communication range of the mobile device to transmit identifying information. Alternatively or additionally, an AP may broadcast a beacon signal containing identifying information that is received by the mobile device.

At block 404, computer-executable instructions of the device storage allocation determination module(s) 246 may be executed to determine a density of APs that are within range of the mobile device based on the results of the Wi-Fi scanning. In particular, the device storage allocation determination module(s) 246 may be configured to assess the number of APs detected based on the scanning to determine an AP density for a geographic region containing the location of the mobile device. In certain example embodiments, the device storage allocation determination module(s) 246 may determine an AP density for a geographic region that encompasses more APs than the number of APs detected by the Wi-Fi scanning.

At block 406, computer-executable instructions of the device storage allocation determination module(s) 246 may be executed to identify other storage allocation parameter data. The data identified at block 406 may include, for example, at least a portion of the route data 248A, at least a portion of the mobility data 248B, and/or at least a portion of the AP density data 248C. For example, the device storage allocation determination module(s) 246 may identify a current route being traversed by a user of the mobile device, a planned route (e.g., a route mapped out using a navigation application executing on the mobile device), historical route data (e.g., a daily commute for a user of the mobile device), and so forth. In certain example embodiments, the device storage allocation determination module(s) 246 may further identify a respective AP density corresponding to each of one or more geographic regions (e.g., Wi-Fi tiles) in addition to the geographic region covered by the scan initiated at block 402. For example, the device storage allocation determination module(s) 246 may determine AP densities at various points along a current, planned, or historical route associated with the mobile device.

At block 408, computer-executable instructions of the device storage allocation determination module(s) 246 may be executed to determine, based at least in part on the AP density determined at block 404 and/or the other storage allocation parameter data identified at block 406, an amount of data storage of the mobile device to allocate to storing AP information (e.g., Wi-Fi the data). As a non-limiting example, the higher the AP density determined at block 404, the greater the amount of mobile device data storage the device storage allocation determination module(s) 246 may determine should be allocated for storing Wi-Fi tile data.

At block 410, the device storage allocation determination module(s) 246 may direct the mobile device to allocate the determined amount of device storage for storing Wi-Fi tile data. The data storage that the device allocates may include various forms of non-volatile data storage (e.g., hard disk storage) and/or various forms of volatile data storage (e.g., random access memory (RAM)).

In certain example embodiments, the amount of mobile device data storage to allocate for storing Wi-Fi tile data may be determined based on the AP density determined at block 404. In certain other example embodiments, the amount of mobile device data storage to allocate for storing Wi-Fi tile data may be additionally or alternatively determined based at least in part on any portion of the other storage allocation parameter data identified at block 406. As a non-limiting example, the device storage allocation determination module(s) 246 may determine that the amount of mobile device data storage that should be allocated for storing Wi-Fi tile data should be adjusted in relation to the mobility data. For example, a greater amount of device data storage may be allocated for Wi-Fi tile data in scenarios in which the mobility data indicates a higher user speed associated with the mobile device than for scenarios in which the mobility data indicates a lower user speed.

As another non-limiting example, the device storage allocation determination module(s) 246 may determine an amount of mobile device data storage to allocate for Wi-Fi tile data based at least in part on route data. For example, the amount of mobile device data storage to allocate for Wi-Fi tile data may be adjusted to ensure that all Wi-Fi tile data downloaded during traversal of a current, planned, or historical device route can be accommodated on the mobile device. In certain other example embodiments, the device storage allocation determination module(s) 246 may make periodic dynamic adjustments to the amount of data storage allocated to Wi-Fi tile data based on changes in the AP density along a route traversed by the mobile device. In still other example embodiments, the device storage allocation determination module(s) 246 may determine a particular time of day during which the user of the mobile device travels along a particular path. In such example embodiments, the device storage allocation determination module(s) 246 may direct the mobile device to increase the data storage allocated for Wi-Fi tile data during that particular time of day.

In certain other example embodiments, the device storage allocation determination module(s) 246 may assess Wi-Fi tile data deletions and downloads that occur, for example, during a daily commute, and may adjust the data storage allocated for Wi-Fi tile data for future commutes accordingly. In addition, more generally, the device storage allocation determination module(s) 246 may track Wi-Fi tile data deletions and downloads over some period of time and may adjust the data storage allocation accordingly.

Figure 5:
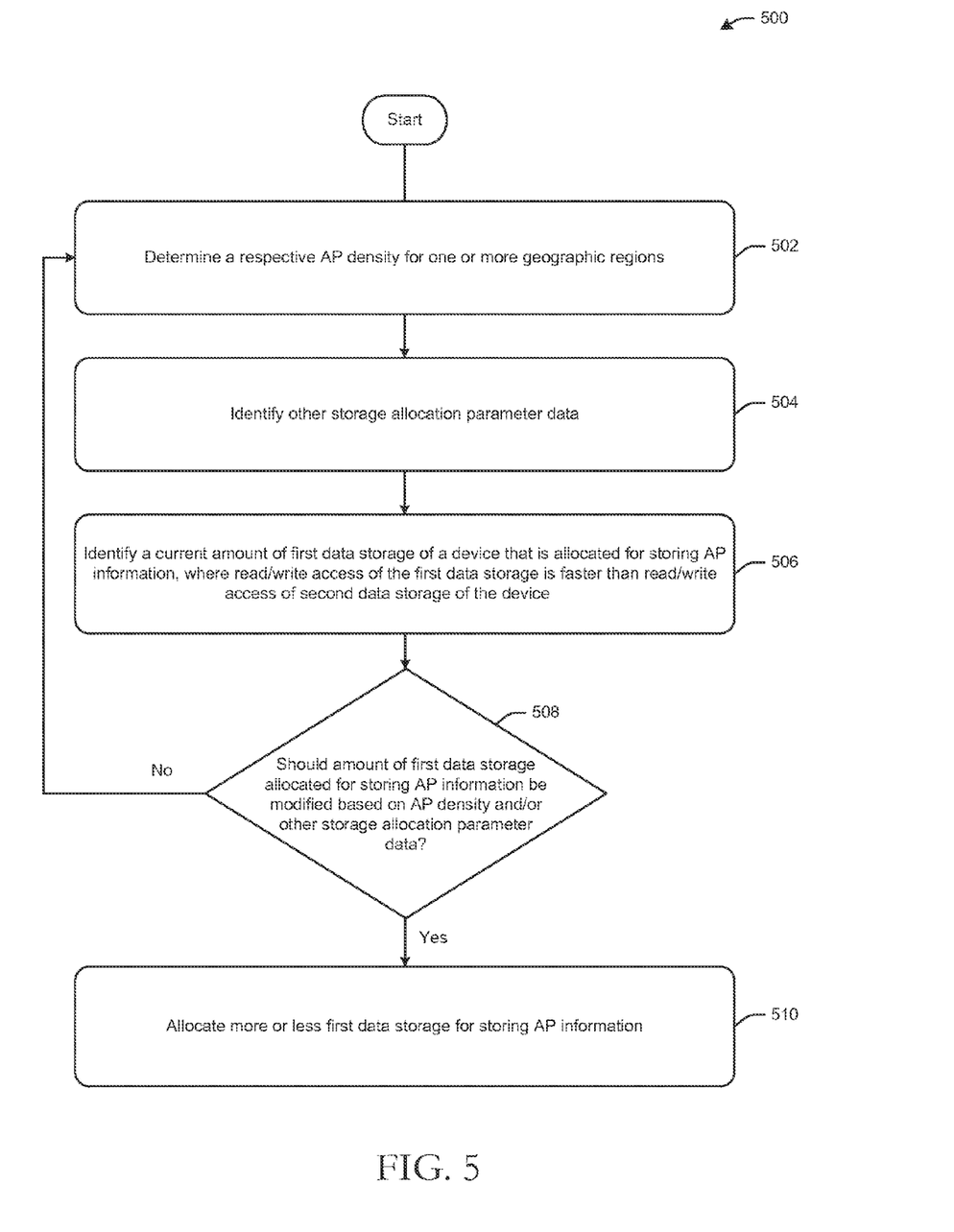
FIG. 5 is a process flow diagram of an illustrative method for determining an amount of device data storage having faster read/write access to allocate for Wi-Fi tile data in accordance with one or more example embodiments of the disclosure.

FIG. 5 is a process flow diagram of an illustrative method 500 for determining an amount of device data storage having faster read/write access to allocate for Wi-Fi tile data in accordance with one or more example embodiments of the disclosure.

At block 502, computer-executable instructions provided as part of the device storage allocation determination module(s) 246 may be executed to determine a respective AP density for one or more geographic regions. The one or more geographic regions may include regions traversed as a mobile device travels along a current, planned, or historical route.

At block 504, computer-executable instructions of the device storage allocation determination module(s) 246 may be executed to identify other storage allocation parameter data. The data identified at block 504 may include, for example, at least a portion of the route data 248A, at least a portion of the mobility data 248B, and/or at least a portion of the AP density data 248C. For example, the device storage allocation determination module(s) 246 may identify a current route being traversed by a user of the mobile device, a planned route (e.g., a route mapped out using a navigation application executing on the mobile device), historical route data (e.g., a daily commute for a user of the mobile device), and so forth.

At block 506, computer-executable instructions of the device storage allocation determination module(s) 246 may be executed to identify an amount of first data storage of the mobile device that is currently allocated for storing Wi-Fi tile data. A current allocation of first data storage may include RAM, cache memory, or any other suitable form of memory capable of being read or written to at faster speeds than second data storage of the device such as, for example, hard disk storage.

At block 508, computer-executable instructions of the device storage allocation determination module(s) 246 may be executed to determine whether the current allocation of first data storage should be modified based at least in part on the AP density(ies) determined at block 502 and/or the other storage allocation parameter data identified at block 504.

In response to a positive determination at block 508, the method 500 may proceed to block 510 where more or less first data storage may be allocated for storing Wi-Fi tile data. Any of a variety of scenarios may result in faster read/write access data storage being allocated for Wi-Fi tile data. As a non-limiting example, the mobility data 248B may indicate that a user speed has increased in which case the amount of faster read/write access data storage allocated for Wi-Fi tile data may be increased to accommodate the greater number of Wi-Fi tile data downloads that will occur over a given period of time. As another non-limiting example, the route data 248A may indicate that the user of the mobile device is travelling as part of a daily commute, and the amount of faster read/write access data storage allocated for Wi-Fi tile data may be increased to allow for faster access to Wi-Fi tile data as part of, for example, Wi-Fi based positioning determinations.

Similarly, any of a variety of scenarios may result in less first data storage being allocated for Wi-Fi tile data. As a non-limiting example, the mobility data 248B may indicate that the mobile device is stationary for some threshold period of time, in which case, the number of local lookups of Wi-Fi tile data that need to be made may be reduced. Accordingly, the amount of first data storage allocated for Wi-Fi tile data may be lowered because, for example, the demands for faster data access by other applications executing on the mobile device may take priority over the lower latency for local lookups offered by storage of Wi-Fi tile data in the first data storage. It should be appreciated that the above examples of scenarios in which the amount of first data storage allocated for Wi-Fi tile data may be adjusted are merely illustrative and not exhaustive.

Referring again to block 508, in response to a negative determination at block 508, the method 500 may again proceed to block 502, and the method 500 may be performed iteratively to periodically determine whether the amount of first data storage allocated for Wi-Fi tile data needs to be adjusted.

One or more operations of the methods 400 or 500 may have been described above as being performed by a user device 204, or more specifically, by one or more program modules, applications, or the like executing on a user device 204. It should be appreciated, however, that any of the operations of either of methods 400 or 500 may be performed by a device storage allocation management server 202, or more specifically, by one or more program modules, applications, or the like executing on a device storage allocation management server 202. In addition, it should be appreciated that processing performed in response to execution of computer-executable instructions provided as part of an application, program module, or the like may be interchangeably described herein as being performed by the application or the program module itself, by a device on which the application, program module, or the like is executing, or by a system that includes such a device. While the operations of the methods 400 or 500 may be described in the context of the illustrative system architecture 200, it should be appreciated that such operations may be implemented in connection with numerous other architectural and device level configurations.

The operations described and depicted in the illustrative methods of FIGS. 3-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
    initiating a wireless scan for identifiable access points (APs) within communication range of a mobile device;
    determining an access point (AP) density based at least in part on the wireless scan, wherein the AP density indicates a number of APs within a geographic region that includes a location of the mobile device, and wherein the number of APs includes the identifiable APs;
    determining, by one or more computers comprising one or more processors, an amount of data storage of the mobile device to allocate for storing AP identifying information associated with the number of APs, wherein the AP identifying information comprises Media Access Control (MAC) addresses of the APs, and wherein the amount of data storage is a function of the number of APs within the geographic region;
    receiving a portion of the AP identifying information; and
    determining at least one of the mobile device is in one or more additional geographic regions or the mobile device will be in the one or more additional geographic regions;
    determining first data storage;
    determining second data storage, wherein a first data access rate associated with the first data storage is greater than a second data access rate associated with the second data storage;
    allocating, by the one or more computers, the amount of data storage from the first data storage after determining the at least one of the mobile device is in the one or more additional geographic regions or the mobile device will be in the one or more additional geographic regions; and
    storing the portion of the AP identifying information in a first portion of the amount of data storage.

2. The method of claim 1, wherein the portion of the AP identifying information comprises Wi-Fi tile data, and wherein the Wi-Fi tile data comprises respective MAC addresses corresponding to a subset of the APs, the method further comprising determining that the subset of the APs are located within one or more Wi-Fi tiles.

3. The method of claim 1, wherein the location of the mobile device is a first location, the AP density is a first AP density, the geographic region is a first geographic region, the AP identifying information is first AP identifying information, and the amount of data storage is a first amount of data storage, the method further comprising:

determining a second AP density that indicates a second number of second APs within a second geographic region that includes a second location of the mobile device, wherein the second AP density is greater than the first AP density;
    determining, by the one or more computers, a second amount of the data storage to allocate for second AP identifying information associated with the second APs, wherein the second amount is greater than the first amount; and
    transmitting a message to the mobile device comprising an indication to increase an allocation of the data storage from the first amount to the second amount.

4. The method of claim 1, wherein the geographic region is a first geographic region and the AP density is a first AP density, the method further comprising:
    determining storage allocation parameter data associated with the mobile device, wherein the storage allocation parameter data comprises at least one of route data or mobility data;
    determining, based at least in part on the storage allocation parameter data, that the mobile device is or will be located in a second geographic region; and
    allocating, by the one or more computers, an additional amount of data storage for storing second AP identifying information associated with second APs located within the second geographic region responsive to determining that the mobile device is or will be located in the additional geographic region.

5. A method, comprising:
    determining a location of a mobile device; and
    determining, by one or more computers comprising one or more processors, an amount of data storage of the mobile device to allocate for access point (AP) identifying information based at least in part on an AP density associated with a geographic region that includes the location of the mobile device, wherein the AP density indicates a number of APs within the geographic region;
    determining at least one of the mobile device is in one or more additional geographic regions or the mobile device will be in the one or more additional geographic regions;
    determining first data storage;
    determining second data storage, wherein a first data access rate associated with the first data storage is greater than a second data access rate associated with the second data storage; and
    allocating, by the one or more computers, the amount of data storage from the first data storage after determining the at least one of the mobile device is in one or more additional geographic regions or the mobile device will be in the one or more additional geographic regions.

6. The method of claim 5, further comprising:
    transmitting a message to the mobile device comprising an indication of the amount of data storage to allocate for the AP identifying information.

7. The method of claim 6, further comprising:
    transmitting at least a portion of the AP identifying information to the mobile device.

8. The method of claim 5, wherein the location of the mobile device is a first location, the AP density is a first AP density, the geographic region is a first geographic region, the AP identifying information is first AP identifying infor mation, and the amount of data storage is a first amount of data storage, the method further comprising:

determining a second location of the mobile device;

determining a second AP density that indicates a second number of APs within a second geographic region that includes the second location of the mobile device, wherein the second AP density is greater than the first AP density;

determining, by the one or more computers, a second amount of the data storage to allocate for second AP identifying information, wherein the second amount is greater than the first amount; and transmitting a message to the mobile device comprising an indication to increase an allocation of the data storage from the first amount to the second amount.

9. The method of claim 8, further comprising:

identifying the second geographic region based at least in part on route data indicative of one or more of a current, historical, or planned route of the mobile device.

10. The method of claim 5, further comprising:

determining mobility data associated with the mobile device; and adjusting the amount of data storage to allocate for the AP identifying information based at least in part on the mobility data.

11. The method of claim 10, further comprising:

identifying a speed of the mobile device based at least in part on the mobility data; and determining that the speed is greater than or equal to a threshold value, wherein the adjusting the amount of data storage comprises increasing the amount of the data storage to allocate for the AP information responsive to the determining that the user speed is greater than or equal to the threshold value.

12. The method of claim 5, further comprising:

identifying route data indicative of a route associated with the mobile device;

determining an additional AP density associated with an additional geographic region traversed by the route; and determining an additional amount of the data storage to allocate for additional AP identifying information based at least in part on the additional AP density.

13. The method of claim 12, wherein the route is one or more of a historical route traversed by the mobile device or a planned route.

14. The method of claim 12, wherein the additional AP identifying information comprises identifying information associated with a group of APs located within the additional geographic region.

15. The method of claim 5, wherein the AP identifying information comprises at least one of a Media Access Control (MAC) address of an AP located within the geographic region or a Service Set Identifier (SSID) associated with the AP.

16. A device, comprising:

at least one memory storing computer-executable instructions; and at least one processor configured to access the at least one memory and execute the computer-executable instructions to:

identify an amount of first data storage allocated for storing wireless access point (AP) identifying information, wherein a first data access rate associated with the first data storage is greater than a second data access rate associated with second data storage;

identify storage allocation parameter data; and determine a modified amount of the first data storage used to store the AP identifying information based at least in part on the storage allocation parameter data;

determine at least one of a mobile device is in one or more additional geographic regions or the mobile device will be in the one or more additional geographic regions; and allocate, by the device, an amount of data storage from the first data storage after determining the at least one of the mobile device is in the one or more additional geographic regions or the mobile device will be in the one or more additional geographic regions.

17. The device of claim 16, wherein the storage allocation parameter data comprises mobility data, and wherein the at least one processor is further configured to execute the computer-executable instructions to:

determine a speed of a user-device from the mobility data;

determine that the speed is greater than or equal to a threshold value; and increase the modified amount of the first data storage used to store the AP identifying information.

18. The device of claim 16, wherein the storage allocation parameter data comprises route data, and wherein the at least one processor is further configured to execute the computer-executable instructions to:

determine a route from the route data;

determine an AP density associated with a second geographic region traversed by the route; and increase the modified amount of the first data storage to accommodate additional AP identifying information corresponding to APs located in the second geographic region.

19. The device of claim 16, wherein the storage allocation parameter data comprises AP density data that indicates a number of APs within a second geographic region, and wherein the at least one processor is further configured to execute the computer-executable instructions to:

determine that the AP density is greater than or equal to a threshold value; and increase the modified amount of the first data storage used to store the AP identifying information responsive to the determination that the AP density is greater than or equal to the threshold value.

* * * * *